C. E. DUNN.
MACHINE FOR THE REDUCTION OF PEAT TURF INTO HALF STUFF.
APPLICATION FILED MAR. 23, 1907.

898,450.

Patented Sept. 15, 1908.

2 SHEETS—SHEET 1.

Witnesses:—

Inventor;
Clifford E. Dunn

C. E. DUNN.
MACHINE FOR THE REDUCTION OF PEAT TURF INTO HALF STUFF.
APPLICATION FILED MAR. 23, 1907.
898,450.
Patented Sept. 15, 1908.
2 SHEETS—SHEET 2.
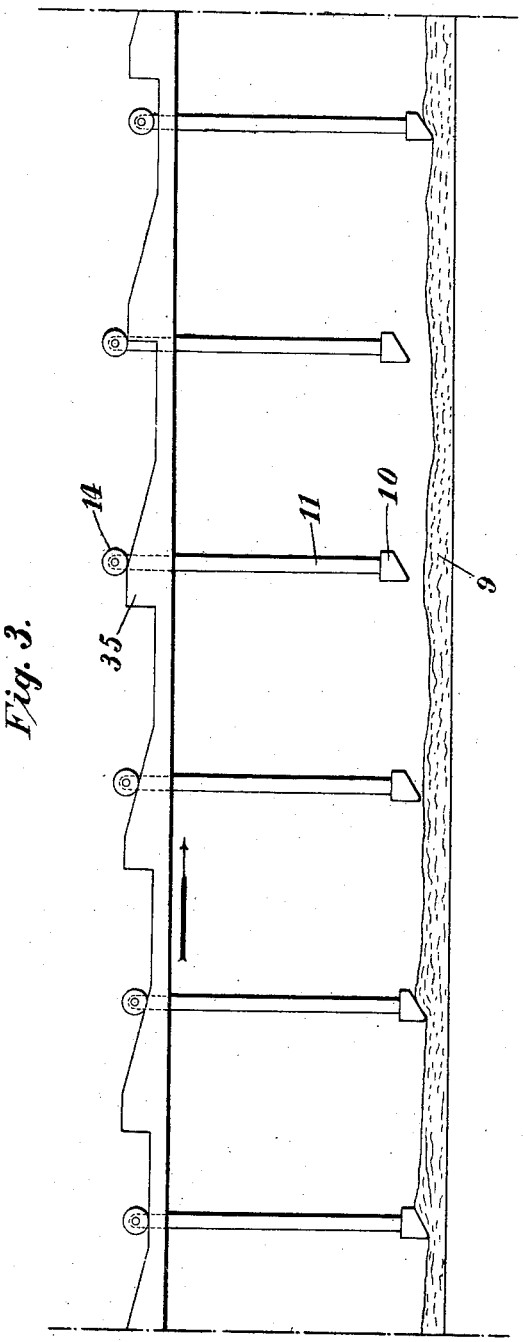

UNITED STATES PATENT OFFICE.

CLIFFORD E. DUNN, OF NEW YORK, N. Y., ASSIGNOR TO PILGRIM PAPER COMPANY, OF NEW YORK, N. Y., A CORPORATION OF MAINE.

MACHINE FOR THE REDUCTION OF PEAT-TURF INTO HALF-STUFF.

No. 898,450.      Specification of Letters Patent.      Patented Sept. 15, 1908.

Application filed March 23, 1907. Serial No. 364,085.

*To all whom it may concern:*

Be it known that I, CLIFFORD E. DUNN, residing in the city of New York, borough of Brooklyn, Kings county, State of New York, have invented certain new and useful Improvements in Machines for the Reduction of Peat-Turf into Half-Stuff, of which the following is a full, clear, and exact specification.

My invention relates to machines for the reduction of peat turf into half stuff suitable for the use of paper and paper board manufacturers.

The type of machine in connection with which I have shown my invention is that wherein the raw peat turf is spread upon a bed plate and there subjected to the action of reciprocating stampers, and my invention consists in an improved construction of such machine in which I employ a stationary bed plate and cause the stampers to travel, and provide means whereby the said stampers are periodically reciprocated vertically during their travel, and the reciprocations of each stamper during its successive trips are so timed that the entire surface of the peat turf is uniformly subjected to the stamping action.

Figure 1:
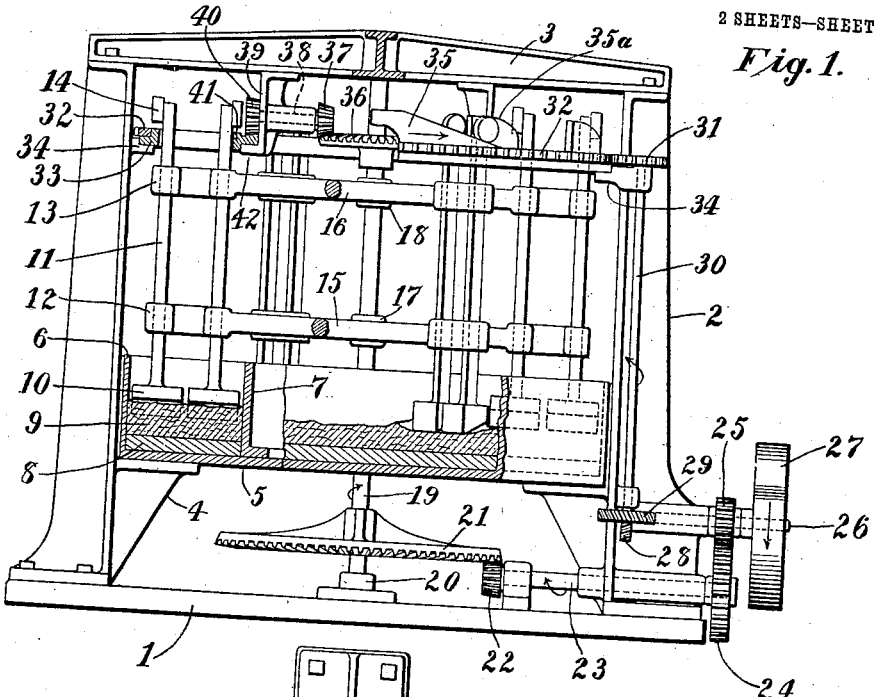
Figure 2:
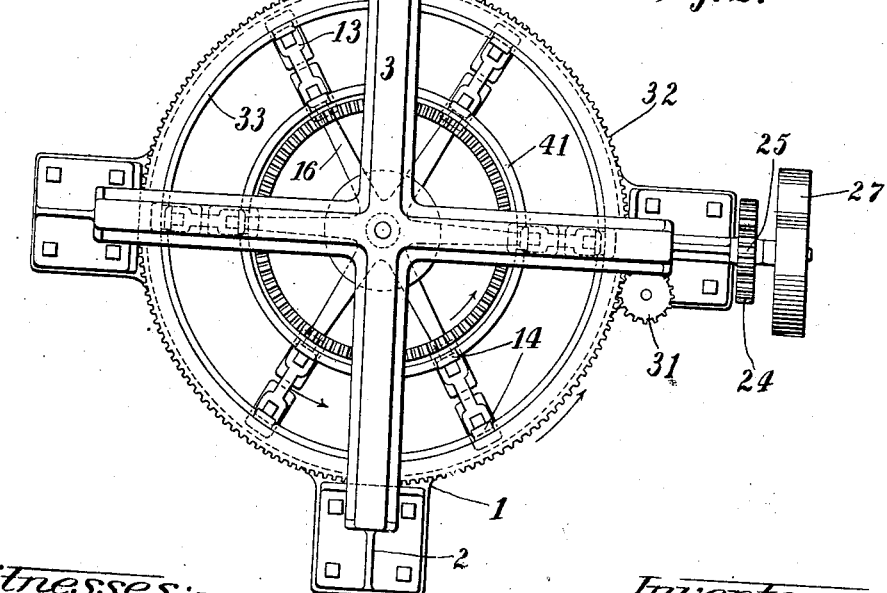

The invention also consists in sundry details of construction hereinafter described, and more particularly pointed out in the drawings, wherein Figure 1 is an elevation, partly in section, of my machine. Fig. 2 is a plan view thereof; and Fig. 3 is a projection by development of the stampers and operating mechanism.

The frame of my machine is composed of a bed plate 1 and upright standards 2 of which I have shown four and which are at their lower ends united to the bed plate 1 and at their upper ends are bound together by a cross 3. Supported by flanges 4, projecting inwardly from each of the uprights 2 is an annular trough 5 having outer walls 6 and inner walls 7, and provided with a bed plate 8 which is preferably made of some rigid material, such as stone or iron, and upon the surface of which and inside the trough, the raw peat turf is spread in a layer and there massaged or reduced by the stamping and rubbing action of the stampers 10.

The machine as illustrated contains six pair of stampers 10 arranged in radial pairs and disposed in two concentric circular paths. Attached to each stamper is an operating shaft 11, rectangular in cross-section, which is mounted so as to slide freely in rectangular bearings formed in collars 12, 13, and the said shafts have journaled to them at their upper extremities, rollers 14, which are mounted so as to rotate freely upon their bearings. Collars 12 and 13 are carried by the arms 15, 16 of two hubs 17, 18, which are fixed upon and revolve with the main shaft 19, which is supported at its lower end upon suitable bearings 20, carried by the bed plate 1, and at its upper end by a bearing in cross 3. Main shaft 19 and the arms attached to hubs 17 and 18 are revolved through bevel gear 21, fixed upon the lower end of the main shaft; bevel pinion 22 fixed upon counter shaft 23; gear 24 which is fixed upon the same shaft and pinion 25 fixed upon shaft 26, which carries main driving pulley 27.

I have shown outer and inner sets of stampers, each of which is provided with rollers 14, by means of which and certain operating cams, presently to be described the stampers are caused to be reciprocated vertically during their travel around the machine.

I will first describe the mechanism whereby the outer set of stampers is reciprocated.

Fixed upon the driving shaft 26 is a worm gear 28, which meshes with a similar gear 29 fixed upon vertical shaft 30, which at its upper end has fixed to it, a pinion 31; this latter pinion engages the teeth of a large toothed ring 32, which is rigidly attached to an annular cam carrier 33, which is mounted upon supporting brackets 34 attached to and projecting inwardly from each of the standards 2. Fixed upon the upper surface of cam ring 33 are a series of cams 35, there being usually as many of such cams fixed upon said ring as there are stampers in the outer ring or row of stampers although this is not essential. As illustrated the machine has six of such cams 35, and they would be revolved in the direction of the arrow upon cam 35, (Fig. 1.) in which direction their front beveled faces would pass under rollers 14, which are traveling in the same direction, but at a slower rate of speed and would lift said rollers and the attached stampers, and cause them to ride up on the upper surface of cam 35, and when released therefrom to drop down and cause the stampers 10 to penetrate the mass of raw peat turf through their wedge shaped faces and permit them to dwell thereon until raised by the next succeeding cam. The cams for actuating the inner ring or row of stampers are operated through a bevel gear 36 fixed upon main shaft 19, which meshes with a bevel pinion 37 fixed upon countershaft 38, journaled in a bracket 39 depending from cross 3 and which carries at its inner end, bevel pinion 40, which engages the teeth of an annular rotating toothed cam carrier 41. This cam carrier is supported upon flanges 42 extending outwardly from the lower part of brackets 39 and upon its outer and upper surface is mounted a series of cams in position to engage the rollers 14, which are journaled upon the upper ends of the inner row of stamper shafts 11. One of such inner cams is shown in Fig. 1., and is designated 35$^a$. The main pulley 27 is moving in the direction of the arrow shown upon its face (Fig. 1.) in which direction countershafts 23 and main shaft 19 will revolve in the direction of their arrows, and the arms 15, 16 will be similarly moved carrying the stampers. Gears 36, 37 and 39 cause the inner cam carrier 41 and the attached cams to move in the same direction but at a higher rate of speed than the stampers by reason of the decreased size of bevel pinion 37, which is driven by the larger bevel gear 36. The shaft 30 which drives or operates the outer cam carrier 32 will then be revolved in the direction indicated by its arrow, causing the outer series of cams 35 to be revolved in the same direction, and likewise at a higher rate of speed than that at which the stampers revolve.

In Fig. 3, I have illustrated a development by projection of the operation of the stampers 10. Here, the stampers as well as the operating cams are moving in the same direction as indicated by the arrow, and the stampers are moving at a less rate of speed than do the operating cams. In this view, the first stamper, counting from the left, is in its position of rest wherein it is carried by its roller 14 upon the lower surface of one of the annular rings 33 or 41, which carries the operating cams. In this position the stamper will have a considerable dwell upon the face of said annular cam carrier, the extent of which is controlled by the space between the vertical face of one cam and bevel of the next succeeding cam, and during this dwell, the beveled face of stamper 10 will be in contact with the peat turf, and as the said stamper is moved forward, it will have a rubbing or massaging effect upon the said peat turf, which then lies between the stamper and the rigid bed plate. The following stampers show a complete operation, the rollers being illustrated as riding up the beveled surface of the cams 35 and having a short dwell upon the top thereof. On the right hand side is illustrated a stamper which has been released and has fallen and penetrated the mass of peat turf to some extent, and illustrates the massaging effect of the stampers when in this position. In this position the roller 14 is shown as out of contact with the cam carrying ring.

In the construction illustrated, the stampers are caused to move in the same direction in which the cams are moving, and it is obvious that moving in this direction, the stampers have a longer dwell upon the surface of the peat turf than would be the case if they moved in the opposite direction, and by this means I am enabled to prolong the rubbing action upon the peat and thereby to reduce the same to half-stuff in a shorter time.

It is obvious that the embodiment of my invention described and shown in the foregoing description and drawings is but one typical form thereof, and that many modifications and changes may be made therefrom without departing from the spirit of my invention, and I do not mean to limit myself to the specific form described, but

What I claim and desire to secure by Letters Patent is:

1. In a peat stamping machine, an annular bed plate, a series of traveling vertically reciprocating stampers having faces beveled in the direction of travel thereof, throughout substantially their entire operative faces means for causing said stampers to travel and means for reciprocating the same vertically during such travel, substantially as described.

2. In a peat stamping machine, an annular fixed bed plate, a main rotating shaft, radiating arms fixed thereto, vertically reciprocating stamper carrying shafts having bearings in said arms, stampers carried by said shafts having faces beveled in the direction of their travel, throughout substantially their entire operative faces and means for reciprocating said stampers during their travel, substantially as described.

3. In a peat stamping machine, an annular fixed bed plate, a vertical central rotating shaft, radiating arms fixed thereto, vertically reciprocating stamper carrying shafts having bearings in said arms, stampers carried by said arms having faces beveled in the direction of their travel throughout substantially their entire operative faces, actuating projections on said shafts and traveling cams engaging said projections and reciprocating said stampers, substantially as described.

4. In a peat stamping machine, a fixed bed plate, a traveling stamper, a shaft therefor, a roller on said shaft, a traveling cam face adapted to pass under said roller and reciprocate said shaft, substantially as described.

5. In a peat stamping machine, a fixed bed plate, a traveling stamper having a face beveled in the direction of its travel, a shaft therefor, a roller on said shaft, a traveling cam face adapted to pass under said roller and reciprocate said shaft, substantially as described.

6. In a peat stamping machine, a fixed bed plate, a plurality of traveling stampers having substantially their entire operative faces beveled in the direction of their travel arranged in concentric rings, shafts therefor, a central vertical revolving shaft, radiating arms fixed thereto, having bearings for said stamper shafts, and means for reciprocating said shafts during their travel, substantially as described.

7. In a peat stamping machine, a fixed bed plate, a plurality of traveling reciprocating bevel faced stampers, non-revoluble on their own axes shafts therefor, a central shaft and radial arms fixed thereto providing bearings for said stamper shafts, projections on said shafts and traveling cams for engaging said projections and reciprocating said shafts, substantially as described.

8. In a peat stamping machine, a fixed bed plate, a plurality of traveling reciprocating stampers, shafts therefor, a central shaft and radial arms fixed thereto, providing bearings for said stamper shafts, rollers on said stamper shafts, traveling cams for engaging said rollers, and reciprocating said shafts and driving means for said cams which cause them to travel in the same direction as and faster than said stampers, whereby the stampers will reciprocate at different points during their successive trips, substantially as described.

9. In a peat stamping machine, a fixed bed plate, a plurality of traveling reciprocating stampers having operating faces beveled throughout substantially their entire operative faces in the direction of their travel, and means for reciprocating said stampers which cause them to reciprocate at different points during their successive trips, substantially as described.

10. In a peat stamping machine, a fixed bed plate, a plurality of traveling reciprocating stampers having operating faces beveled throughout substantially their entire operative faces in the direction of their travel, shafts therefor, a central shaft and radial arms fixed thereto providing bearings for said stamper shafts, reciprocating projections on said shafts and traveling cams for engaging said projections and reciprocating said shafts, substantially as described.

11. In a peat stamping machine, a fixed bed plate, a plurality of traveling reciprocating stampers having operating faces beveled throughout substantially their entire operative faces in the direction of their travel, shafts therefor, a central shaft and radial arms fixed thereto providing bearings for said stamper shafts, rollers on said stamper shafts, traveling cams for engaging raid rollers and reciprocating said shafts, and driving means for said cams which cause them to travel in the same direction as and faster than said stampers, whereby the stampers will reciprocate at different points during their successive trips, substantially as described.

12. In a peat stamping machine, a fixed bed plate, a plurality of traveling reciprocating bevel faced stampers arranged radially in pairs and disposed in concentric rings, shafts for said stampers, holding them against revolution on their own axis a central shaft and radial arms fixed thereto and providing bearings for said stamper shafts, rollers on said stamper shafts, traveling cams engaging said rollers and reciprocating said stamper shafts and driving means for said cams moving them at a different rate of speed than the stampers, whereby the stampers in their successive trips engage different points over the bed plate, substantially as described.

13. In a peat stamping machine, a fixed bed plate, a plurality of traveling reciprocating stampers arranged radially in pairs and disposed in concentric rings, shafts for said stampers, a central shaft and radial arms fixed thereto and providing bearings for said stamper shafts, rollers on said stamper shafts, traveling cams engaging said rollers and reciprocating said stamper shafts and driving means for said cams moving them at a faster rate of speed than the stampers, and in the same direction, whereby the stampers in their successive trips engage different points over the bed plate, substantially as described.

14. In a peat stamping machine, a bed plate, a series of stampers traveling in a circular path, actuating devices for reciprocating said stampers, traveling in the same direction but at a higher speed and driving means for said parts, substantially as described.

15. In a peat stamping machine, a bed plate, a series of traveling stampers having operating faces beveled throughout substantially their entire operative faces in the direction of their travel, means for reciprocating said stampers and permitting them to dwell upon the surface of the peat during a portion of their travel, substantially as described.

16. In a peat stamping machine, a fixed bed plate, a series of traveling stampers having operating faces beveled throughout substantially their entire operative faces in the direction of their travel, shafts therefor holding said stampers against revolution on their own axes, traveling cams engaging said shafts and reciprocating said stampers and permitting them to dwell upon the peat turf between reciprocations and driving means, causing the said stampers and cams to travel at different speeds, whereby the stampers reciprocate at different points in the peat turf, upon successive trips, substantially as described.

17. In a peat stamping machine, a reciprocating, traveling, stamper non-revoluble on its own axis having an operative face beveled throughout substantially its entire operative face in the direction of its travel, means for causing said stamper to travel and for reciprocating the same during said travel.

18. In a peat stamping machine, a vertically-reciprocating, traveling, stamper non-revoluble on its own axis having an operative face beveled throughout substantially its entire operative face in the direction of its travel, means for causing said stamper to travel, and traveling means for reciprocating the stamper which permit it to dwell upon the peat turf between reciprocations.

In witness whereof, I have hereunto set my hand in the presence of two subscribing witnesses.

CLIFFORD E. DUNN.

Witnesses:
ADOLPH F. DINSE,
CHARLES A. SCHEUBER.